(12) United States Patent
Cok et al.

(10) Patent No.: US 8,094,933 B2
(45) Date of Patent: Jan. 10, 2012

(54) METHOD FOR CONVERTING AN INPUT COLOR SIGNAL

(75) Inventors: Ronald S. Cok, Rochester, NY (US); Michael E. Miller, Honeoye Falls, NY (US)

(73) Assignee: Global OLED Technology LLC, Herndon, VA (US)

( * ) Notice: Subject to any disclaimer, the term of this patent is extended or adjusted under 35 U.S.C. 154(b) by 1061 days.

(21) Appl. No.: 11/955,769

(22) Filed: Dec. 13, 2007

(65) Prior Publication Data

US 2009/0154805 A1 Jun. 18, 2009

(51) Int. Cl.
*G06K 9/00* (2006.01)

(52) U.S. Cl. ......... 382/167; 382/162; 382/274; 345/694

(58) Field of Classification Search ................... 382/162, 382/167, 274; 345/76, 212, 690; 358/518, 358/520, 523; 313/499, 498, 500
See application file for complete search history.

(56) References Cited

U.S. PATENT DOCUMENTS

| | | | |
|---|---|---|---|
| 5,929,843 A | 7/1999 | Tanioka | |
| 6,453,067 B1 | 9/2002 | Morgan et al. | |
| 6,570,584 B1 | 5/2003 | Cok et al. | |
| 6,897,876 B2 | 5/2005 | Murdoch et al. | |
| 7,184,067 B2 | 2/2007 | Miller et al. | |
| 7,737,989 B2 * | 6/2010 | Pettitt et al. | 345/589 |
| 7,755,652 B2 * | 7/2010 | Credelle et al. | 345/694 |
| 7,999,769 B2 * | 8/2011 | Miyagawa et al. | 345/76 |
| 2003/0034992 A1 | 2/2003 | Brown Elliott et al. | |
| 2005/0225574 A1 * | 10/2005 | Brown Elliott et al. | 345/694 |

OTHER PUBLICATIONS

Lee et al., "TFT-LCD with Rgbw Color System," SID 03 Digest, Issn/0003-0966X/Mar. 3402-1212, © 2003 SID.

* cited by examiner

*Primary Examiner* — Samir Ahmed
*Assistant Examiner* — Ali Bayat
(74) *Attorney, Agent, or Firm* — Morgan, Lewis & Bockius LLP (57) ABSTRACT

A white light-emitting microcavity light-emitting diode device, comprising a method for converting a red, green, and blue (RGB) input signal to a converted signal having RGB color signals and an additional saturated color signal, by calculating saturation of the additional saturated color in the RGB input signal to determine the proportion of the additional saturated color signal to the sum of the converted RGB color signals such that the proportion of the additional saturated color signal is constant or decreases as the saturation of the additional color in the RGB input signal increases.

19 Claims, 8 Drawing Sheets

METHOD FOR CONVERTING AN INPUT COLOR SIGNAL

FIELD OF THE INVENTION

The present invention relates to methods for converting an input RGB signal into a signal for driving a display having more than three colors of light-emitting elements.

BACKGROUND OF THE INVENTION

Additive color digital image display devices are well known and are based upon a variety of technologies such as cathode ray tubes, liquid crystal modulators, and solid-state light emitters such as Organic Light Emitting Diodes (OLEDs). In a common OLED color display device, a pixel includes red, green, and blue colored OLEDs. These light-emitting color primaries define a color gamut, and by additively combining the illumination from each of these three OLEDs, i.e. with the integrative capabilities of the human visual system, a wide variety of colors can be achieved. OLEDs can be used to generate color directly, using organic materials that are doped to emit energy in desired portions of the electromagnetic spectrum, or alternatively, broadband-emitting (apparently white) OLEDs can be attenuated with color filters to achieve red, green and blue.

It is possible to employ a white, or nearly white, OLED along with the red, green, and blue OLEDs to improve power efficiency and/or luminance stability over time. Other possibilities for improving power efficiency and/or luminance stability over time include the use of one or more additional non-white OLEDs, for example, as is taught in U.S. Pat. No. 7,184,067 entitled, "Color OLED Display System" by Miller et al. U.S. Pat. No. 6,570,584 entitled, "Broad Color Gamut Display" by Cok et al. describes the use of an additional color subpixel for improving color gamut. However, images and other data destined for display on a color display device are typically stored and/or transmitted in three channels, that is, having three imaging/data signals corresponding to a standard (e.g. sRGB) or specific (e.g. measured CRT phosphors) set of primaries. It is also important to recognize that this data is typically sampled assuming a particular spatial arrangement of light-emitting elements. In an OLED display device, these light-emitting elements are typically arranged side by side on a plane. Therefore, if incoming image data is sampled for display on a three-color display device, the data will also have to be re-sampled for display on a display having four OLEDs per pixel, rather than the three OLEDs used in a three-channel display device. U.S. Pat. No. 6,897,876 entitled, "Method for Transforming Three Color Input Signals to Four or more Output Signals for a Color Display" by Murdoch et al. describes a method for transforming three-color RGB signals for RGBW signals. This disclosure describes an effective method for converting an RGB signal to a four or more color signal for driving a display, having four differently colored saturated emitters; in which the most efficient of the primaries can be used to form as large a percentage of the output luminance as possible. As such, primaries in addition to RGB primaries are typically driven to high values in preference to RGB primaries.

In the field of CMYK printing, conversions known as undercolor removal or gray component replacement are derived from RGB to CMYK conversions, or more specifically CMY to CMYK conversions. At their most basic, these conversions subtract some fraction of the CMY values and add that amount to the K value. These methods are complicated by image structure limitations, because they typically involve non-continuous tone systems, but because the white of a subtractive CMYK image is determined by the substrate on which it is printed, these methods remain relatively simple with respect to color processing. Attempting to apply analogous algorithms in continuous-tone additive color systems causes color errors, if the additional primary is different in color from the display system is white point. Additionally, the colors used in these systems can typically be overlaid on top of one another and so there is also no need to spatially resample the data when displaying four colors.

In the field of sequential-field color projection systems, it is known to use a white primary in combination with red, green, and blue primaries. White is projected to augment the brightness provided by the red, green, and blue primaries, inherently reducing the color saturation of some, if not all, of the colors being projected. A method proposed by Morgan et al. in U.S. Pat. No. 6,453,067 issued Sep. 17, 2002, teaches an approach to calculating the intensity of the white primary dependent on the minimum of the red, green, and blue intensities, and subsequently calculating modified red, green, and blue intensities via scaling. The scaling ostensibly corrects the color errors resulting from the brightness increase provided by the white; but simple correction by scaling will never restore, for all colors, all of the color saturation lost in the addition of white. The lack of a subtraction step in this method ensures color errors in at least some colors. Additionally, Morgan's disclosure describes a problem that arises if the white primary is different in color from the desired white point of a display device without adequately solving it. The Morgan method simply accepts an average effective white point, which effectively limits the choice of white primary color to a narrow range around the white point of the device. Since the red, green, blue, and white elements are projected to spatially overlap one another, there is no need to spatially resample the data for display on the four-color device. This method is specific to displays employing a fourth neutral or white color and is not relevant when the additional light-emitting elements produce a saturated color.

A similar approach is described by Lee et al. (SID International Symposium, Baltimore, Md.) to drive a color liquid crystal display having red, green, blue, and white pixels. Lee et al. calculate the white signal as the minimum of the red, green, and blue signals, then scale the red, green, and blue signals to correct some, but not all, color errors, with the goal of luminance enhancement paramount. The method of Lee et al. suffers from the same color inaccuracy as that of Morgan and is applicable to the addition of neutral colored light-emitting elements only and no reference is made to spatial resampling of the incoming three-color data to the array of red, green, blue and white elements.

In the field of ferroelectric liquid crystal displays, another method is presented by Tanioka in U.S. Pat. No. 5,929,843, issued Jul. 27, 1999. Tanioka's method follows an algorithm analogous to the familiar CMYK approach, assigning the minimum of the R, G, and B signals to the W signal and subtracting the same from each of the R, G, and B signals. To avoid spatial artifacts, Tanioka teaches a variable scale factor applied to the minimum signal resulting in smoother colors at low luminance levels. Because of its similarity to the CMYK algorithm, the Tanioka method suffers from the same problem cited above, namely that a white pixel having a color different from that of the display is white point will cause color errors and therefore it is not useful when adding additional saturated color primaries. Similarly to Morgan et al. (U.S. Pat. No. 6,453,067, referenced above), the color elements are typically projected to spatially overlap one another; and so there is no need for spatial resampling of the data.

It should be noted, that the physics of light generation and modulation of OLED display devices differ significantly from the physics of devices used in printing, display devices typically used in field sequential color projection, and liquid crystal displays. These differences impose different constraints upon the method for transforming three-color input signals. Among these differences is the ability of the OLED display device to turn off the illumination source on an OLED by OLED basis. This differs from devices typically used in field sequential display devices and liquid crystal displays, since these devices typically modulate the light that is emitted from a large-area light source that is maintained at a constant level. Further, it is well known in the field of OLED display devices that high drive current densities result in shorter OLED lifetimes. This same effect is not characteristic of devices applied in the aforementioned fields.

The prior art also includes methods for resampling image data from one intended spatial arrangement of light emitting elements to a second spatial arrangement of light emitting elements. US Patent Application No. 2003/0034992A1, by Brown Elliott et al., published Feb. 20, 2003, discusses a method of resampling data that was intended for presentation on a display device having one spatial arrangement of light emitting elements having three colors to a display device having a different spatial arrangement of three color light-emitting elements. Specifically, this patent application discusses resampling three-color data that was intended for presentation on a display device with a traditional arrangement of light-emitting elements to three-color data that is intended for presentation on a display device with an alternate arrangement of light-emitting elements. However, this application does not discuss the conversion of data for presentation on a four-or-more color device.

There still remains a need, therefore, for an effective method for transforming three-color input signals that bear images or other data, to a four-color signal having three-color primaries and an additional saturated color primary. It is particularly important that this new effective method perform this conversion to maintain high image quality under a broad range of possible display conditions.

SUMMARY OF THE INVENTION

The need is met in one embodiment of the present invention with a method for converting a red, green, and blue (RGB) input signal to a converted signal having RGB color signals and an additional saturated color signal, by calculating saturation of the additional saturated color in the RGB input signal to determine the proportion of the additional saturated color signal to the sum of the converted RGB color signals such that the proportion of the additional saturated color signal is constant or decreases as the saturation of the additional color in the RGB input signal increases.

ADVANTAGES

The present invention has the advantage that it increases the light output and reduces any angular color change of an LED device.

DETAILED DESCRIPTION OF THE INVENTION

The applicants have noted that regardless of the display technology, displays can be constructed with light-emitting elements having optical performance that varies with respect to parameters such as drive level or viewing angle. For example, an OLED display has been described in co-pending U.S. patent application Ser. No. 11/867,885, in which a light-emitting element is formed whose emitted light is complementary to a red, green, or blue light-emitting element in which the additional light-emitting element's performance changes as a function of viewing angle by a larger amount than at least one of the red, green, or blue primaries. In such displays, applying prior-art methods to convert from an input RGB signal to a signal for driving an RGB signal and an additional saturated primary will tend to apply any additional saturated primary to achieve the largest color gamut, and to use as much of the light having color that is near the color of the additional saturated primary as possible. The prior-art techniques are constrained to optimize the luminance efficiency of the display when viewed on axis. However, these methods result in displayed images with unacceptable color or luminance shifts for some images or viewing conditions when the optical performance of this additional saturated primary varies with respect to viewing angle. The present invention provides a conversion from an RGB input signal to a signal having RGB color signals and an additional saturated color signal such that these unacceptable color or luminance shifts are avoided or severely limited.

Figure 1:
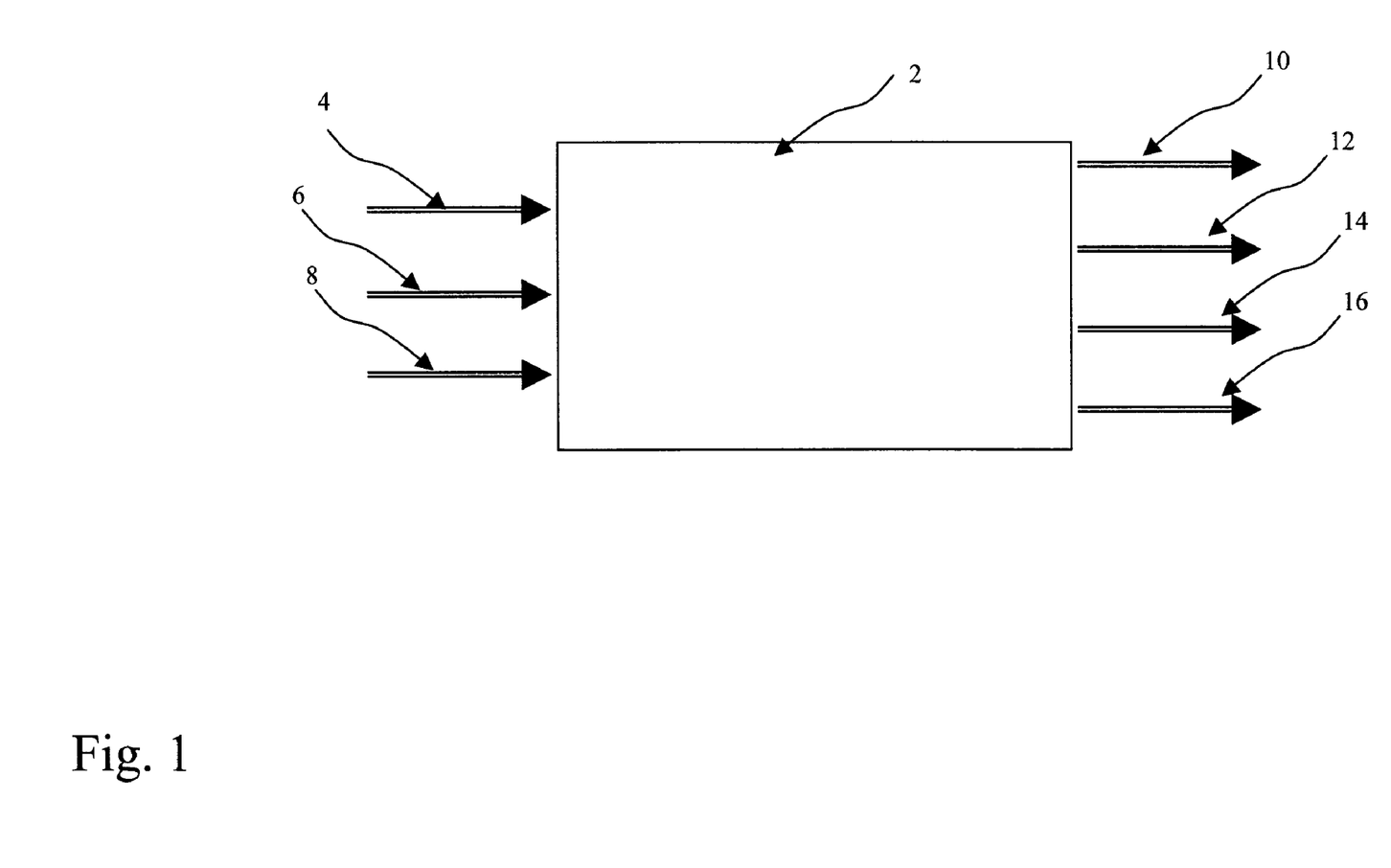
FIG. 1 illustrates a digital processor of the present invention.

The need is met by providing a method and digital signal processor 2 for converting a red, green, and blue (RGB) input signal 4, 6, 8 respectively, as shown in FIG. 1, to a converted signal having RGB color signals 10, 12, 14 respectively, and an additional saturated color signal 16, by calculating the saturation of the additional saturated color in the RGB input signal 4, 6, 8 to determine the proportion of the additional saturated color signal 16 to the sum of the converted RGB color signals 10, 12, 14 such that the proportion of the additional saturated color signal 16 is constant or decreases as the saturation of that specific additional color in the RGB input signal 4, 6, 8 increases. This method allows the additional saturated color to be utilized in combination with the converted RGB color signals 10, 12, 14 such that the effect of the undesirable optical properties that heretofore were associated with the additional saturated color signal 16 is mitigated. Further this method limits the additional saturated color signal 16 from being used in isolation during which the effect of undesirable optical properties would be more visible.

Figure 2:
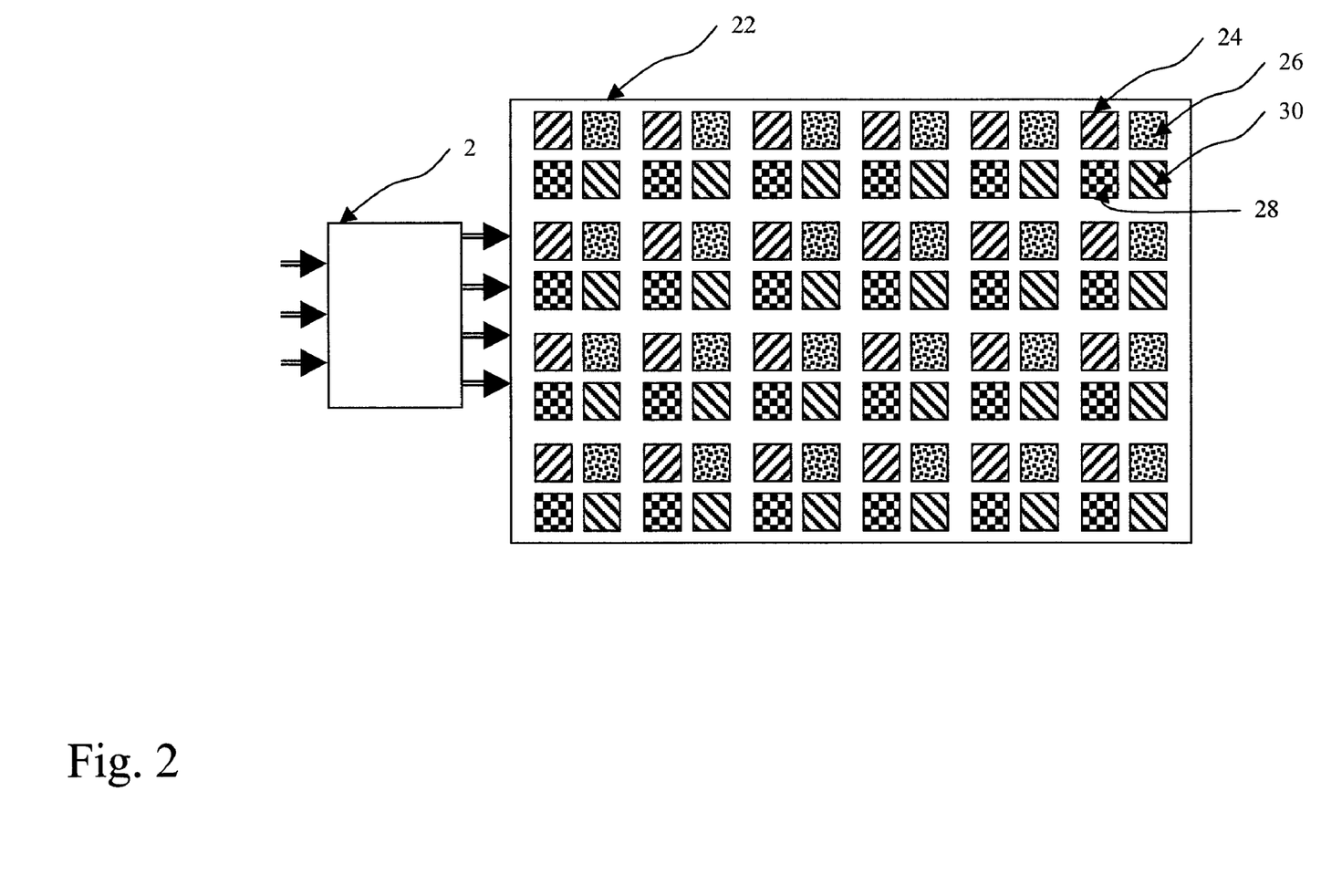
FIG. 2 illustrates a display system employing a digital processor of the present invention.
Figure 3:
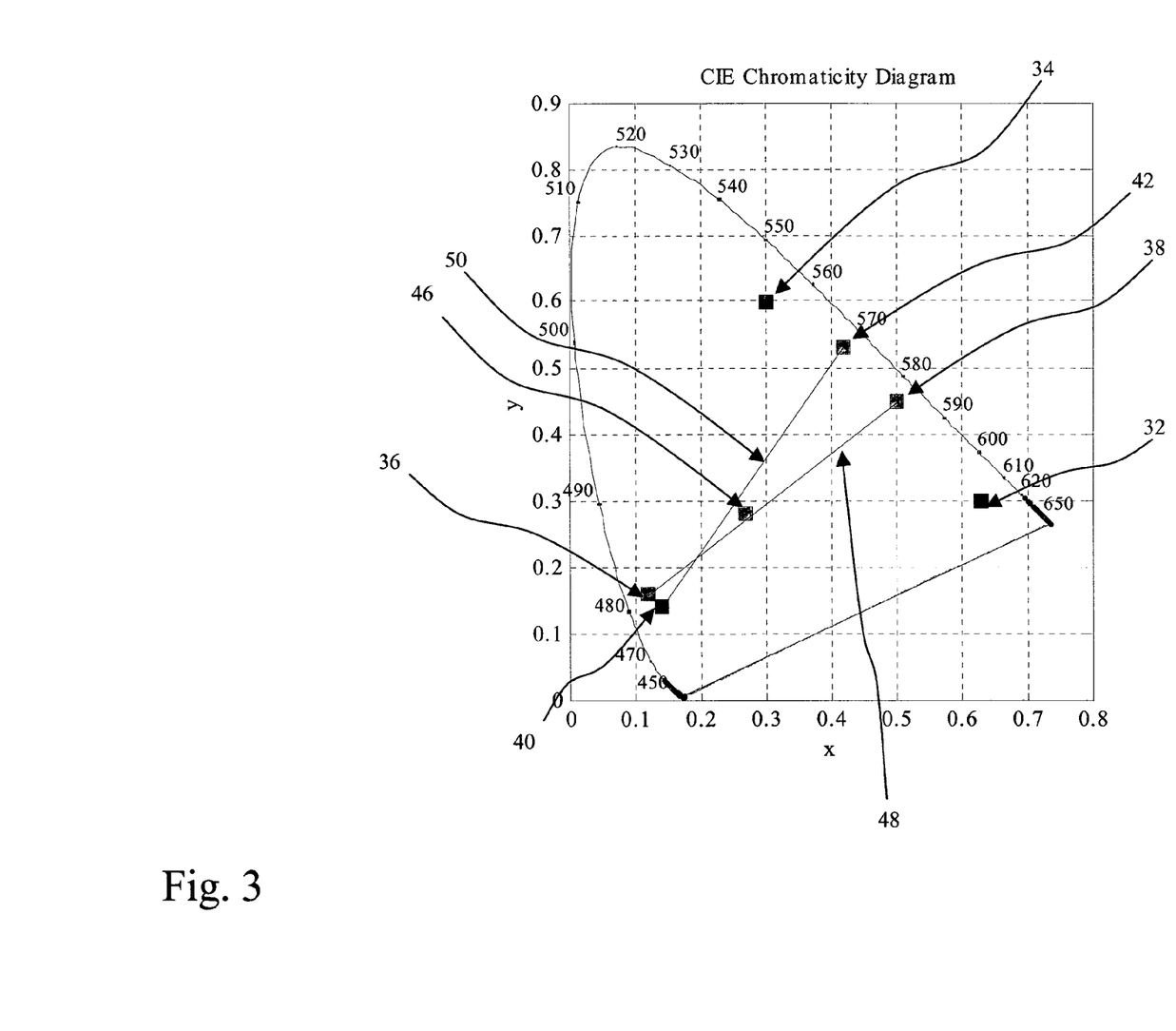
FIG. 3 is a chromaticity diagram illustrating chromaticity coordinates of a display system such as depicted in FIG. 2.

As an example, the method may be used to drive an electro-luminescent display as shown in FIG. 2. As depicted in this figure, the electro-luminescent display can be formed on a substrate 22 and include multiple arrays of four light-emitting elements 24, 26, 28, and 30, each produces four different colors of light. These light-emitting elements 24, 26, 28, and 30 produce red, green, blue and an additional saturated color of light, specifically yellow in this example. The four light-emitting elements 24, 26, 28, and 30 produce red, green, blue, and the additional colors of light having the chromaticity coordinates 32, 34, 36, and 38, respectively, as shown in FIG. 3, when the color of light is measured perpendicular to the substrate. However, as the angle between the measuring device and the substrate is decreased, the color of light emitted by one or more of the light-emitting elements 24, 26, 28, and 30 for producing red, green, blue and the additional color of light, may change. In this example, the color produced by the light-emitting elements 28, 30 for producing blue and yellow light, respectively, may change to chromaticity coordinates 40 and 42, respectively. Notice, however, that the change in the chromaticity coordinates for the blue light-emitting elements (i.e., the length of a vector connecting 36 and 40) is less than the change in the chromaticity coordinates for the yellow light-emitting elements (i.e., the length of the vector connecting 38 and 42). Line 48 indicates the colors that can be created by forming a mixture of light from the chromaticity coordinates 38 and the chromaticity coordinate 36 while the line 50 indicates the colors that can result from a mixture of the chromaticity coordinate 40 and 42. As shown, the distance of an aim white point 46 to the nearest point in each of these lines is much smaller than the change in chromaticity coordinates 38, 40 for the yellow light-emitting element when viewed from two different angles. Therefore, it is possible that the change in chromaticity coordinates as a function of viewing angle for colors near the white point of the display 46 will be smaller than the change in chromaticity coordinates as a function of viewing angle when rendering a yellow with only the yellow light-emitting element 30. Therefore, it can be acceptable to apply significant energy from the yellow light-emitting element 30 when rendering near white colors 46; although it may not be acceptable to apply as much energy from the yellow light-emitting element when attempting to render colors near yellow. The method and digital signal processor of the present invention provides a method for accomplishing this skilled manipulation.

The method of the current invention may be accomplished using several numerical techniques. In a first embodiment, the method includes the steps shown in FIG. 4. As shown in this figure, the RGB input signal will be received 60 and will optionally be converted 62 to relative luminance intensities. This step is useful in systems wherein the RGB input signal is gamma encoded, as is typical in many color transmission standards, including the well-known sRGB color space. The resulting values are then optionally normalized 64 to the RGB chromaticity coordinates of the display by applying a 3×3 matrix to the RGB input signal, as is well known within the art. Once these steps are complete, the method of the present invention decomposes 66 the RGB input signal into a neutral component and a saturated color component. This step can involve subtracting the minimum of the normalized relative luminance intensities for each pixel from each of the red, green, and blue normalized relative luminance intensities. The minimum then serves as the neutral component. The remainder of the red, green, and blue normalized relative luminance intensities serves to provide the saturated color component.

Figure 4:
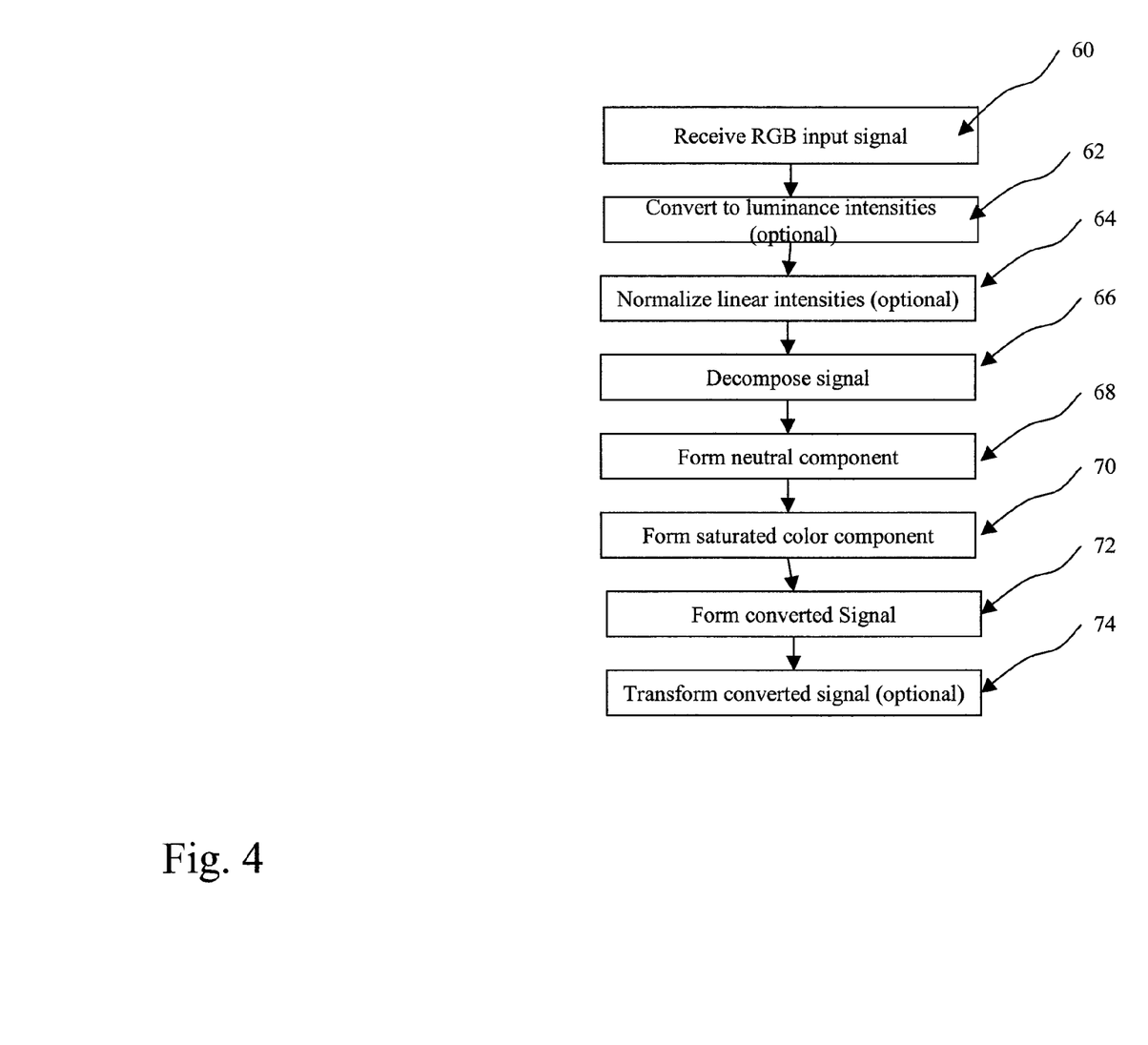
FIG. 4 is a flow diagram illustrating a first embodiment of the present invention.

The neutral component is formed 68 as a combination of the RGB input signal and additional saturated color signals. This can be accomplished by determining the combination of the additional saturated primary with at least one other primary that may be used to form the white point of the display and determining the relative signals of each that are required to provide this neutral color.

The saturated color component is then formed 70 from the RGB input signal. Within the embodiment as described, the red, green, and blue normalized relative luminance intensities that were calculated earlier serve as the saturated color component. The converted signal can then be determined 72 by summing the resulting normalized relative luminance intensities for the neutral and the saturated color components. Alternatively, the converted signal is formed as other positive valued functions of the neutral and saturated color components.

In many systems, the converted signal is transformed 74, often through a nonlinear operation, to provide code values for controlling a voltage or current source to modulate light from the light-emitting elements within the display. In some displays, transform 74 adjusts for other factors. For instance, it is known that the light-emitting elements may have different sizes. This step adjusts the converted signal values obtained in step 72 to adjust for the difference in sizes. For example, these values are divided by the relative area of the light-emitting elements to be driven by the converted signal or a correlate of these values. It is also possible for the relative luminous efficiency of the light-emitting elements to vary and the method can employ a correlate of the luminous efficiency of the light-emitting elements when performing this transform step 74.

Although both the steps of converting the RGB input signal to relative luminance intensity 62, or converting the additional saturated color signal to gamma-corrected code values 74, are listed as optional, it will often be desirable for the method to further include converting 62 the RGB input signal to relative luminance intensity or converting 74 the additional saturated color signal to gamma-corrected code values.

In this example, the light-emitting element driven by the additional saturated color signal emits yellow light. However, many other light-emitting elements can be driven by the additional saturated color signal, although it will generally be desirable to employ broadband emitters to which the human eye has a high efficacy with this method to improve power efficiency or lifetime of the displays. Therefore, in many desirable embodiments, the light-emitting element driven by the additional saturated color signal 38 will be yellow or cyan.

In this method, the additional saturated color signal 16 is used to form only the neutral color component, while the saturated color component is formed entirely from the RGB color components and these signals are summed through the use of a positive valued function. As a result, the use of the saturated color signal 16 in the final converted signal will be at its maximum when forming the neutral color. This value will decrease and at least one of the converted red 10, green 12, or blue 14 signals will increase as the color formed is further away from neutral, represented by the white point 46 of the display and closer to any of the saturated color primaries 32, 34, 36, 38. As a result, the proportion of the additional saturated color signal 12 to the sum of the converted RGB color signals 10, 12, 14 decreases as the saturation of the additional color in the RGB input signal 4, 6, 8 increases.

Figure 5:
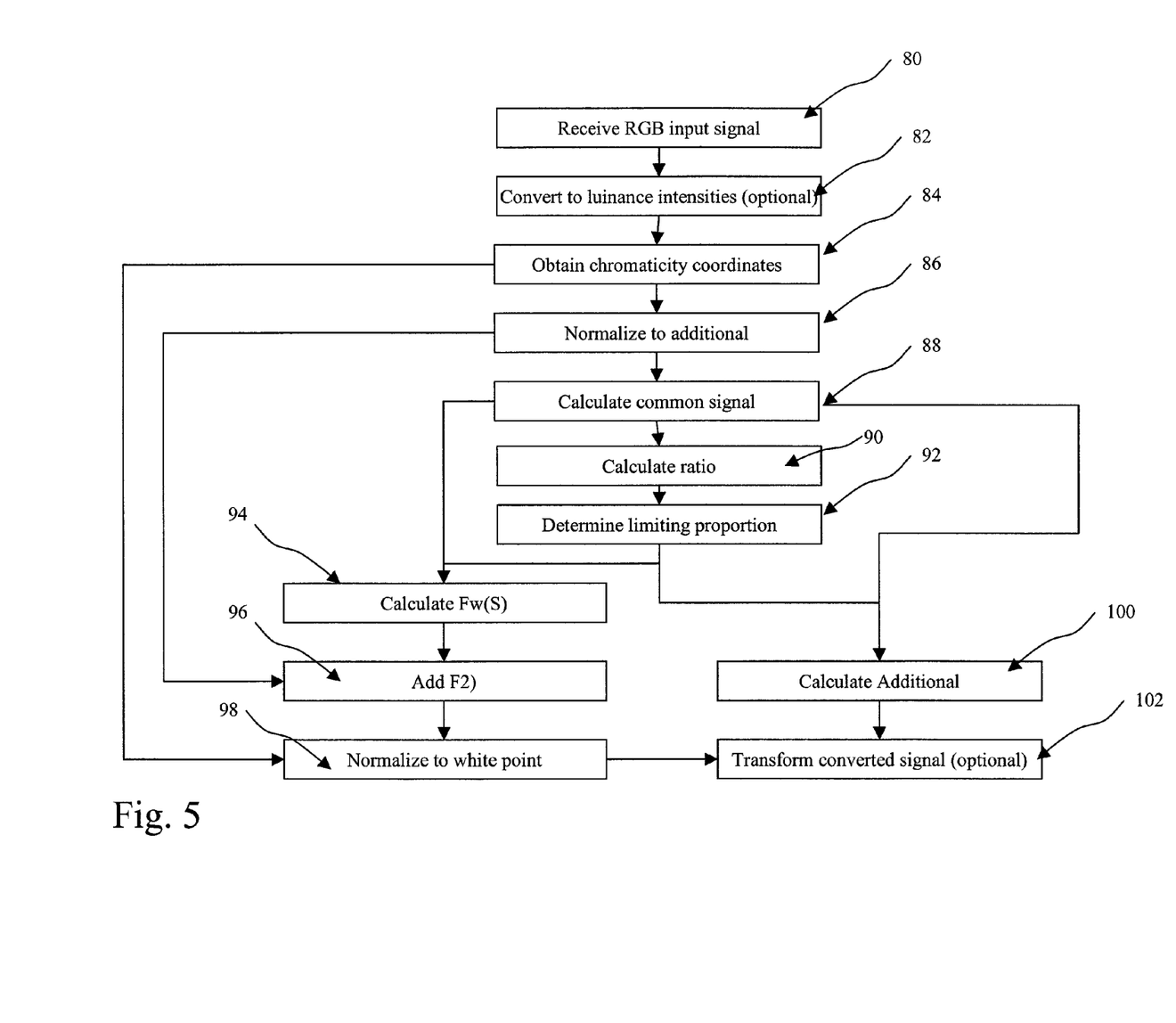
FIG. 5 is a flow diagram illustrating a second embodiment of the present invention.

In a second embodiment, the method includes the steps shown in FIG. 5. This embodiment includes calculating an intermediate signal as a function of a common signal and calculating the converted signal as a ratio of the initial RGB input signal and the intermediate signal. As shown in FIG. 5, the RGB input signal will once again be received 80 and optionally converted 82 to relative luminance intensities. This step is useful in systems wherein the RGB input signal is gamma encoded as is typical in many color transmission standards, including the well-known sRGB color space. Aim chromaticity coordinates are obtained 84 for light-emitting elements driven by the converted signal, as well as the white point of the display.

The relative luminance intensities are then normalized 86 with respect to the chromaticity coordinates of the light-emitting element driven by the additional saturated color signal. During this step, the red, green, and blue intensities are normalized such that the combination of unit intensity of each produces a color stimulus having XYZ tristimulus values equal to those of the additional saturated color signal. This is accomplished by scaling the red, green, and blue intensities, shown as a column vector, by the inverse of the intensities required to reproduce the color of the light-emitting element driven by the additional saturated color signal using the light-emitting elements driven by the red, green, and blue input signals.

The normalized signals are used to calculate 88 a common signal S of a function F1 (Rn, Gn, Bn). In one embodiment, the function F1 is a special minimum function, which chooses the smallest non-negative signal of the three normalized signals. The result of the function F1, which will be referred to as S, is then employed in multiple ways. First, this value represents the amount of the RGB input signal that can be formed from the additional saturated color signal, and can be used to determine the proportion of the additional saturated color signal to the sum of the converted RGB color signals. This is accomplished, for example, by calculating 90 the ratio of S to the sum of the RGB input signal values or by simply calculating the ratio of S to the signal value of a color complementary to the RGB input signal values. For example, if the additional saturated color signal is used to drive a yellow light-emitting element approximately complementary to a blue light-emitting element in the display, the ratio of S to the blue input signal value can be calculated.

The resulting value is used to determine 92 a maximum or limit for the proportion of S formed using the additional saturated color signal. To ease understanding, this maximum or limit for the proportion will be referred to as k. This value k is typically a ratio, calculated or determined from other operations, such as look-up operations. This function limits the proportion of the additional saturated color signal to the sum of the converted RGB color signals such that the proportion of the additional saturated color signal is constant or decreases as the saturation of the additional color in the RGB input signal increases. However, it may do so using numerous and different criteria. For example, it limits the additional saturated color signal based upon the saturation of the input image signal itself. It optionally employs an optical characteristic of at least the light-emitting element driven by the additional saturated color signal. For example, if the light-emitting element to be driven by the additional saturated color signal changes as a function of viewing angle, and this change is somewhat compensated for by changes in one or more additional light-emitting elements in the display; and if a limit in color change or luminance is known, the proportion of the additional saturated color signal to the final RGB color signals is limited such that the limit in color change or luminance is not exceeded. In this way, this maximum proportion may be determined by obtaining a set of criteria for determining acceptable color rendering, obtaining the optical performance data for at least light-emitting elements to be driven by the additional saturated color signal for at least two viewing conditions, determining the maximum proportion of the additional saturated color signal to the sum of the converted RGB color signals applied within the set of criteria for each of the two viewing conditions; and combining the maximum proportion of the additional saturated color signal to the sum of the converted RGB color signals for each of the two viewing conditions to obtain the maximum proportion of the additional saturated color signal applied.

Once the maximum or limit for the proportion of S (denoted as k) has been determined 92, it can be used to determine the final converted color signal. In this method, S is used to calculate 94 the value of a function F2(S). In one embodiment, the function F2 provides arithmetic inversion and reduces S by the limit for the proportion of S, that is:

$$F2(S) = -kS.$$

As such, F2(S) can not exceed the absolute value of the proportion k multiplied by S.

The output of function F2 is added to the normalized color signals obtained in step 86 to calculate 96 an intermediate signal. The intermediate signal is normalized 98 to the display white point by scaling by the intensities required to reproduce the color of the light-emitting element to be driven by the additional saturated color signal using the RGB light-emitting elements. The resulting values represent the RGB color signals within the converted color signal.

The common signal S is additionally used to calculate 100 the value of the additional saturated color signal within the converted color signal. In one embodiment, this is accomplished by multiplying the common signal S by the limit for the proportion k. That is, the additional saturated color signal is equal to kS. Within this implementation, the additional saturated color signal is limited by the proportion k. Optionally, the normalized intensities from step 98 and the additional saturated color signal, which together form the converted signal, is transformed 102 into drive values for the display.

In this exemplary embodiment, when equal values are subtracted from the normalized color signals obtained in step 86 and added to the common signal S to form the additional saturated color signal, accurate color rendition is obtained. However, this is not required within this invention. However a value less than or equal to the value provided as the additional saturated color signal must be subtracted from the normalized color signals obtained in step 86 to provide the desired limit. The normalization steps provided by this method allow for accurate reproduction of colors within the gamut of the display device regardless of the color of the light-emitting element driven by the additional saturated color signal.

The exemplary embodiment just described includes calculating an intermediate signal as a function of a common signal. Effectively, this method calculates the converted signal as a ratio of the initial RGB input signal and the intermediate signal through the renormalization step 98. The calculation of the intermediate signal can include a transformation of the RGB input signal, calculating a minimum of the RGB input signal, or can be a function of the minimum of a transformed RGB input signal and subtracting the minimum, or can be a function of the minimum, of the transformed RGB input signal from the RGB input signal.

Figure 6:
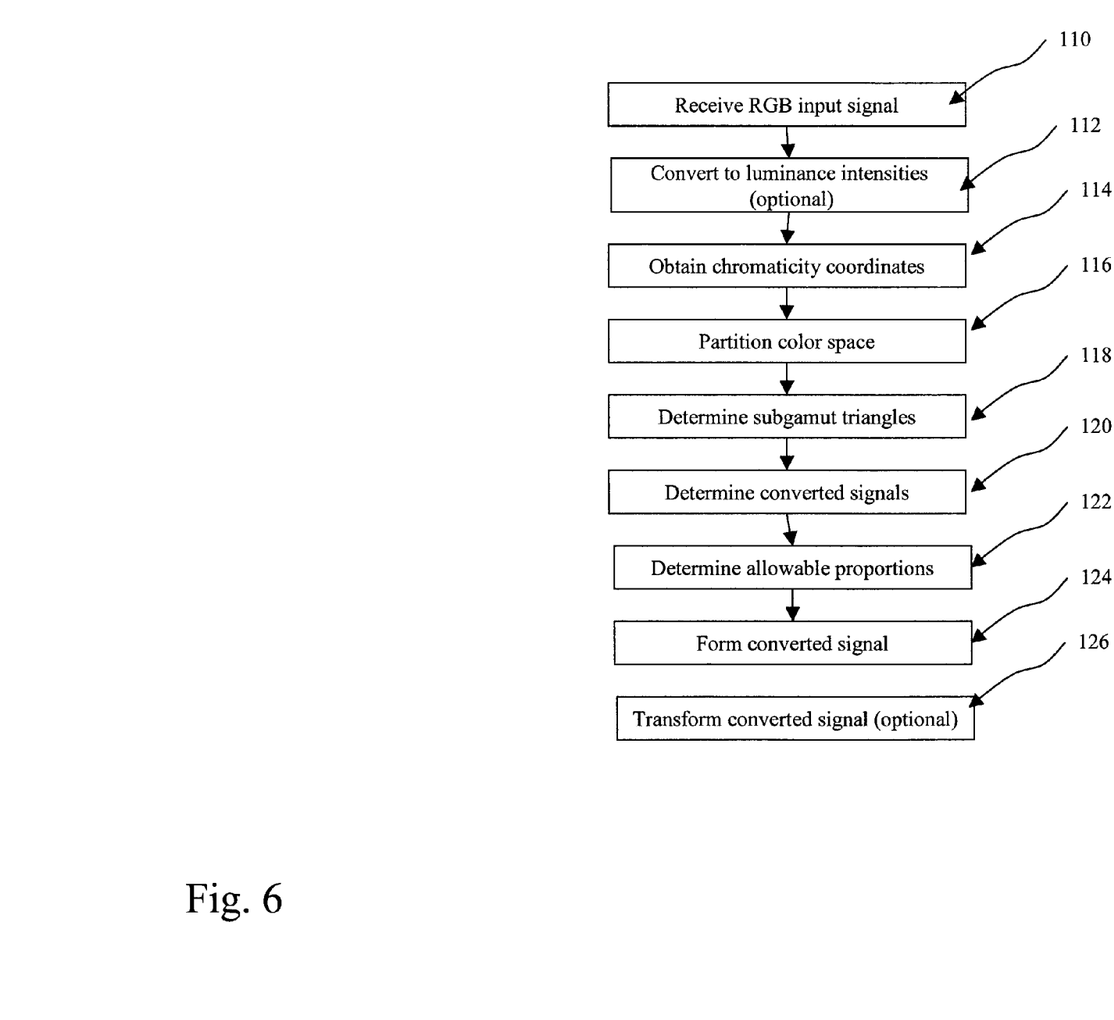
FIG. 6 is a flow diagram illustrating a third embodiment of the present invention.

In a third exemplary embodiment, the method includes the steps shown in FIG. 6. This method involves determining the location of the RGB input signal within subgamuts of the display, determining intermediate signals for each of the subgamuts and determining the converted signal as a ratio of the intermediate signal. As shown in FIG. 6, the RGB input signal will once again be received 110 and optionally converted 112 to relative luminance intensities.

Aim chromaticity coordinates are obtained 114 for light-emitting elements driven by the converted signal where the aim chromaticity coordinates specify a color space. For example, returning to FIG. 3, the red 32, green 34 and blue 36 and yellow 38 chromaticity coordinates may define the color space.

The color space is partitioned 116 into three or more subgamut triangles. Returning to FIG. 3, the vertices of a first subgamut triangle are specified by the red 32, green 34, and blue 36 chromaticity coordinates, the vertices of a second subgamut triangle can be specified by the red 32, yellow 38 and blue 38 chromaticity coordinates and the vertices of a third subgamut triangle can be specified by the yellow 38, green 34 and blue 36 chromaticity coordinates.

The subgamut triangles in which the color represented by the RGB input signal is located will be determined 118. For example, if an RGB input signal represented the white point of the display 46, this whitepoint resides within the subgamut triangles with vertices specified by both the red 32, green 34, and blue 36 chromaticity coordinates and the subgamut triangle with vertices specified by the yellow 38, green 34 and blue 36 chromaticity coordinates.

The converted RGB and additional saturated color signals required to render the color represented by the RGB input signal for each subgamut triangle are determined 120 by calculating the proportions of each of the two separate triads of chromaticity coordinates required to form the RGB input signal. The allowable proportion of the additional saturated color signal to the sum of the converted RGB color signals is determined 122 for producing the color represented by the RGB input signal. This step can be completed as described earlier in step 92 of the previous embodiment.

The converted signal is formed 124 from a combination of the converted RGB and additional saturated color signals for each subgamut triangle subject to the allowable proportion. That is, a proportion of each of the two sets of values for rendering the RGB input signal is added together, such that the proportion of the additional saturated color signal to the sum of the converted RGB color signals is constant or decreases as the saturation of the additional color in the RGB input signal increases. In many systems, the converted signal is transformed 126, often through a nonlinear operation, to provide code values for controlling a voltage or current source to modulate light from the light-emitting elements within the display.

Within this embodiment, as well as in the previous embodiment, whenever the RGB input signal is near white, that is whenever, the RGB input signal values are nearly equal to each other, and the color of the light-emitting element driven by the additional saturated color signal is nearly complementary to one of the light-emitting elements driven by the red, green, or blue signals, it is possible to form the desired color almost entirely through a mixture of light from the light-emitting element to be driven by the additional saturated color and its complementary color. For example, returning to FIG. 3, again, one can see that the display white point 46 is approximately on a line between the blue chromaticity coordinate 36 and the yellow chromaticity coordinate 38. Each of the previous two exemplary embodiments allow the flexibility to adjust the proportion of the additional saturated color signal 16 to the sum of the converted RGB color signals 10, 12, 14 over a broad range, including allowing the additional saturated color signal 16 to be greater than the sum of the converted RGB color signals 10, 12, 14. In such embodiments, it is desirable for the converted signal for an RGB input signal 4, 6, 8 having equal RGB input signal values to be formed primarily from the additional saturated color signal 16 and one of the converted RGB color signals (e.g., 14 in the previous example) under many circumstances. However, each of these methods allow the maximum proportion of the additional saturated color signal 16 to the sum of the converted RGB color signals 10, 12, 14 to be limited. Each of the three embodiments, moreover, allows the maximum proportion to decrease as the additional saturated color signal 16 increases.

In embodiments in which the RGB input signal represents colors that are outside the gamut triangle defined by vertices equal to the chromaticity coordinates of the red 32, green 34, and blue 36 light-emitting elements, each of the previous methods can attempt to render colors outside this gamut using primarily the additional saturated color signal. Therefore, in certain embodiments, it is useful to clip or to gamut map the RGB input signal, such that none of these colors are represented. Such methods are well known in the art. In this way, the RGB input signal 4, 6, 8 is mapped to a color gamut defined by chromaticity coordinates of light-emitting elements driven by the converted RGB color signals 10, 12, 14.

Figure 7:
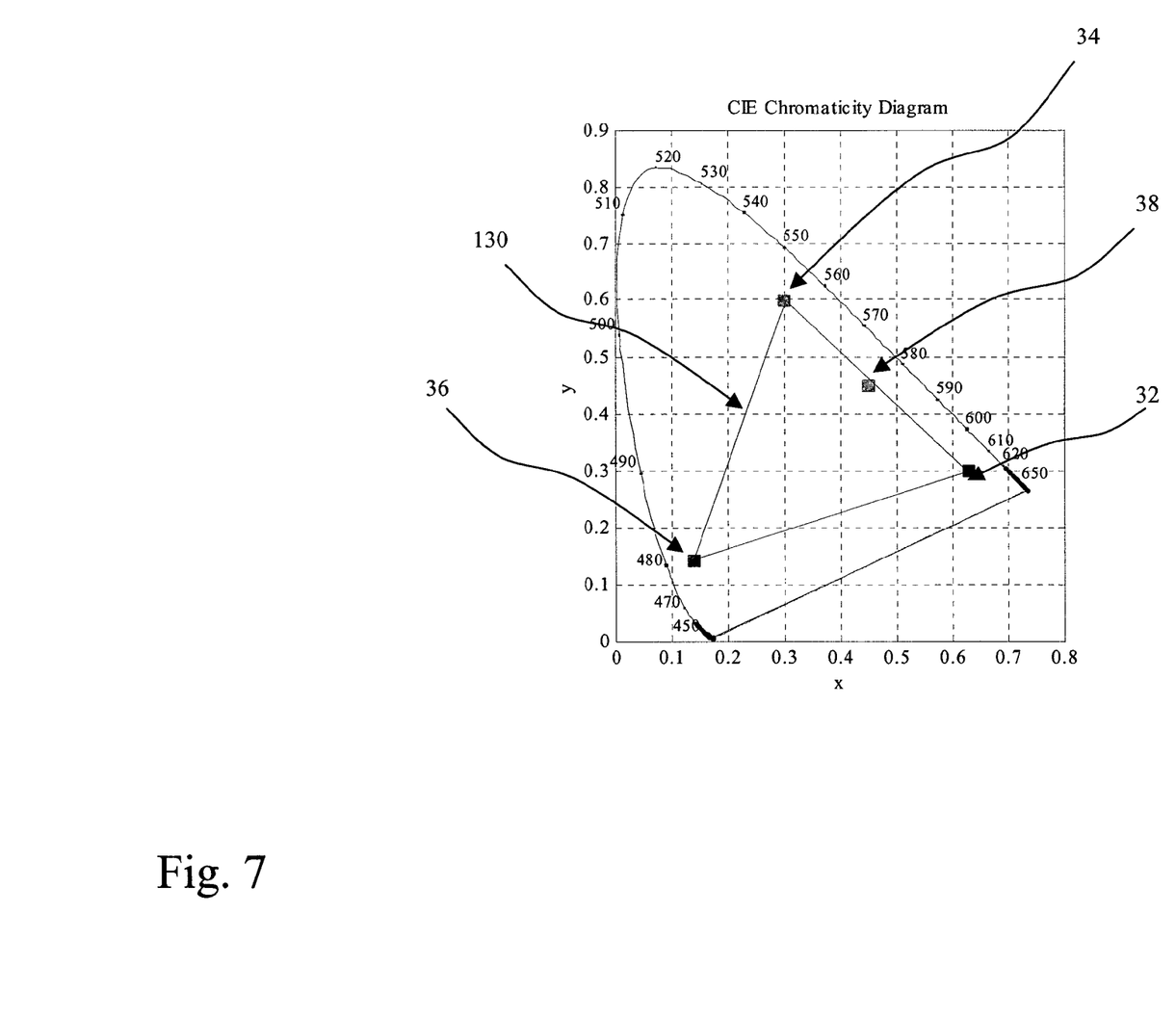
FIG. 7 is a chromaticity diagram illustrating chromaticity coordinates of another display system such as depicted in FIG. 2.

It is also possible for the chromaticity coordinates 38 of the additional saturated color signal 16 to be inside the gamut triangle 130 defined by the red 32, green 34, and blue 36 chromaticity coordinates as shown in FIG. 7. In such systems, the aim chromaticity coordinates for light-emitting elements, e.g., 38, driven by the additional saturated color signal 16 are obtained and the aim chromaticity coordinates of the light-emitting element 38 driven by signal 16 is formed from a combination of the chromaticity coordinates of two of the light-emitting elements (e.g., the red 32 and green 34 chromaticity coordinates) is driven by the converted RGB color signals. In these systems, it is desirable for the sum of the converted RGB color signals for driving two of the light-emitting elements to be inversely related to the additional saturated color signal 16, such that the intensity of the converted red and green signals increases as the RGB input signal approaches the color of the light-emitting element driven with the additional saturated color signal.

This disclosure has provided three different exemplary embodiments of methods useful for converting a red, green, and blue (RGB) input signal to a converted signal having RGB color signals and an additional saturated color signal. The methods include calculating saturation of the additional saturated color in the RGB input signal to determine the proportion of the additional saturated color signal to the sum of the converted RGB color signals such that the proportion of the additional saturated color signal is constant or decreases as the saturation of the additional color in the RGB input signal increases. However, the present invention is not limited to these explicit embodiments. Any of these three embodiments, or others for providing this conversion, can be embedded in a digital or analog controller for controlling a display. Numerous types of digital processors are known in the art, including field programmable gate arrays, application specific digital circuits, or general purpose processors that can be used to employ the method of the present invention.

Therefore, it is possible to provide a digital processor for receiving a red, green, and blue (RGB) input signal, converting the RGB input signal to a converted signal having RGB color signals and an additional saturated color signal by calculating saturation of the additional saturated color in the RGB input signal to determine the proportion of the additional saturated color signal to the sum of the converted RGB color signals such that the proportion of the additional saturated color signal is constant or decreases as the saturation of the additional color in the RGB input signal increases, and outputting the converted signal to drive an electronic display.

Figure 8:
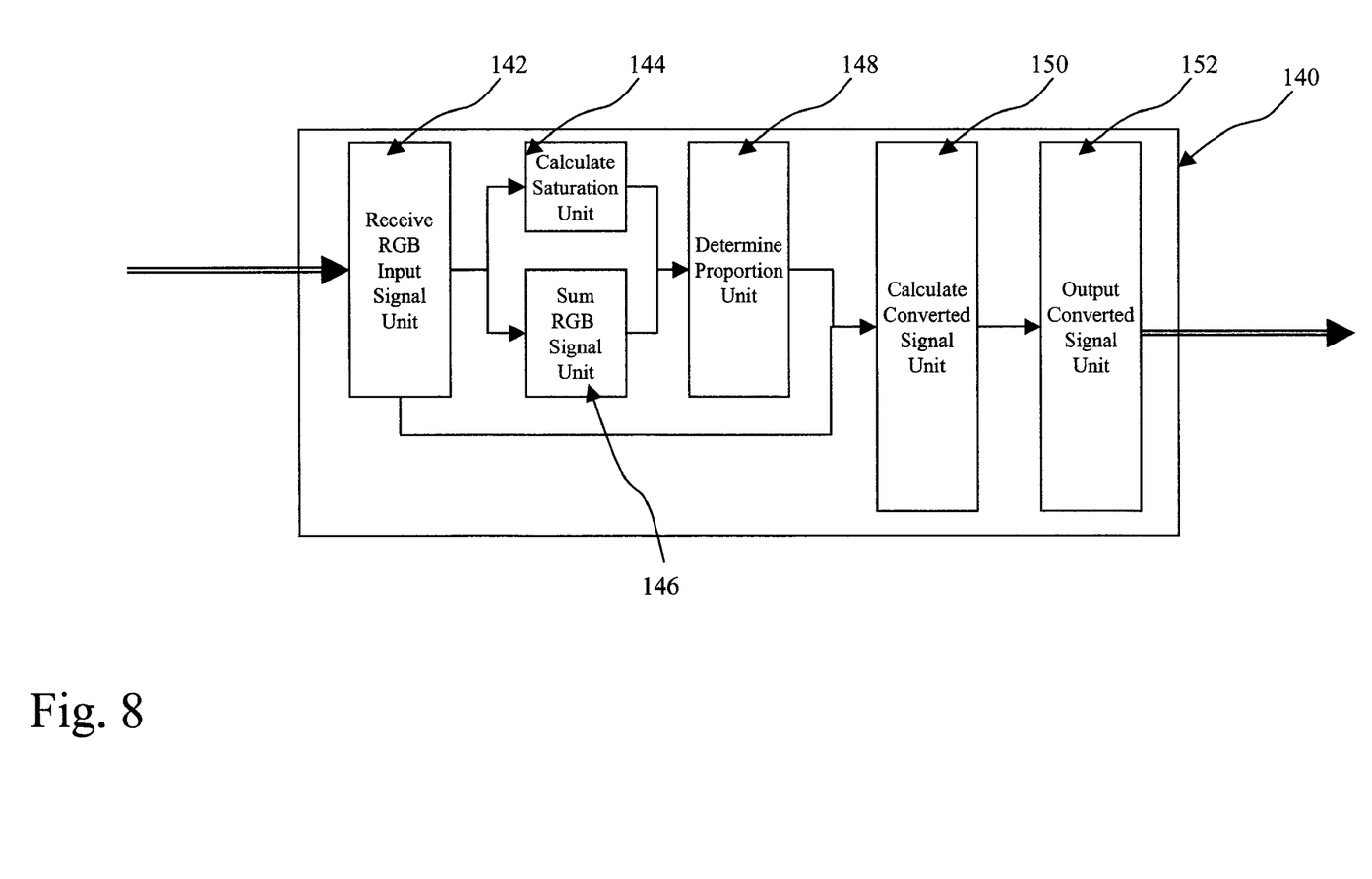
FIG. 8 is a depiction of a digital processor of the present invention.

Such a digital processor is shown in FIG. 8. As shown the digital processor 140 will include a unit 142 for receiving the RGB input signal, a unit 144 for calculating the saturation of the additional saturated color in the RGB input signal, a unit 146 for calculating the sum of RGB signal values, a unit 148 for determining the proportion of the additional saturated color signal with respect to the sum of the RGB signal values, a unit 150 for calculating the converted signal and a unit 152 for outputting the converted signal.

Although the method and digital signal processor of the present invention can be employed with any display device, including electro-luminescent displays employing other organic light emitting diodes or inorganic light-emitting diodes, liquid crystal displays, plasma displays, and field emissive displays, it is particularly useful when employed with electro-luminescent displays employing microcavity devices. Such devices enhance the output of thin, high-optical index, films of light-emitting materials by depositing light-emitting elements within thin film cavities, typically including one reflective electrode and one semitransparent electrode. Such thin-film devices can exhibit a strong color dependence on angle. Unfortunately, it can also be the case that some emitters are very inefficient. One approach to overcoming the inefficiency of one emitter is to employ an additional, more-efficient light-emitting element to replace the light from one or more less-efficient emitters. Unfortunately, these additional, more-efficient light-emitting elements may vary significantly in their color as viewing angle changes. In some embodiments, color filters can be used together with red, green, and blue microcavity devices where the color filters are designed to limit changes in color as a function of viewing angle. Unfortunately, these color filters reduce the efficiency of the red, green and blue light-emitting elements. Therefore, one can employ one or more additional light-emitting elements that do not have color filters. These additional light-emitting elements will typically have a higher luminance efficiency than the light-emitting elements with color filters but, unfortunately are more likely to change color as a function of viewing angle. While the addition of color filters to the additional light-emitting elements can reduce the angular changes in color, such a color filter reduces the efficiency of the additional elements and thereby the reason for including the additional light-emitting elements. Hence, in prior-art designs employing microcavities, either inefficient emitters are employed, wherein an unacceptably strong angular variation is prevalent; or inefficient color filters are used in combination with additional light-emitting elements. The method of the present invention can be employed to control this undesirable angular variation in color while allowing the use of highly-efficient, unfiltered light-emitting elements for forming certain colors, ideally frequently occurring, near-white colors.

Electro-luminescent displays employing microcavity devices can be practiced with either active- or passive-matrix devices. In a preferred embodiment, the present invention is employed in a flat-panel OLED device composed of small-molecule or polymeric OLEDs as disclosed in, but not limited to U.S. Pat. No. 4,769,292, issued Sep. 6, 1988 to Tang et al., and U.S. Pat. No. 5,061,569, issued Oct. 29, 1991 to VanSlyke et al. Polymer OLED materials can also be employed. Inorganic devices, for example, employing quantum dots formed in a polycrystalline semiconductor matrix (for example, as taught in US Publication 2007/0057263 by Kahen), and employing organic or inorganic charge-control layers, or hybrid organic/inorganic devices can be employed as well. Many combinations and variations of organic or inorganic light-emitting displays can be used to fabricate such a device, including both active- and passive-matrix displays having either a top- or bottom-emitter architecture.

In this disclosure, complementary colors of light are those colors of light that, when viewed together, form a substantially white-appearing light such as light on or near the Planckian locus. For example, blue and yellow form a complementary pair, as do cyan and red, and magenta and green.

The invention has been described in detail with particular reference to certain preferred embodiments thereof, but it will be understood that variations and modifications can be effected within the spirit and scope of the invention.

PARTS LIST 2 digital signal processor
4 red input signal
6 green input signal
8 blue input signal
10 red signal
12 green signal
14 blue signal
16 additional saturated color signal
22 substrate
24 red light-emitting element
26 green light-emitting element
28 blue light-emitting element
30 light-emitting element for emitting an additional saturated color of light
32 red chromaticity coordinates
34 green chromaticity coordinates
36 blue chromaticity coordinates
38 chromaticity coordinates for the additional color of light
40 off-angle chromaticity coordinates for blue light-emitting element
42 off-angle chromaticity coordinates for yellow light-emitting element
46 aim white point
48 line
50 line
60 receive RGB input signal step
62 convert to relative luminance intensity step
64 normalize to RGB chromaticity coordinates step
66 decompose step
68 form neutral component step
70 form saturated color component step
72 determine converted signal step
74 transform converted signal step
80 receive RGB input signal step
82 convert to relative luminance intensity step
84 obtain aim chromaticity coordinates step
86 normalize to chromaticity coordinates of additional saturated color signal step
88 calculate common signal step
90 calculate ratio step
92 determine limit step
94 calculate F2(S) step
96 calculate intermediate signal step
98 normalize to display white point step
100 calculate additional saturated color signal step
102 transform converted signal step
110 receive RGB input signal step
112 convert to relative luminance intensity step
114 obtain chromaticity coordinates step
116 partition color space step
118 determine subgamut triangles step 120 determine converted signal for each subgamut triangle step
122 determine allowable proportion step
124 form converted signal step
126 transform converted signal step
130 gamut triangle
140 digital processor
142 receive RGB input signal unit
144 calculate saturation unit
146 calculate sum of RGB unit
148 determine proportion unit
150 calculate converted signal unit
152 output converted signal unit

The invention claimed is:

1. A method for converting a red, green, and blue (RGB) input signal to a converted signal having RGB color signals and an additional saturated color signal, comprising the steps of:
  calculating saturation of the additional saturated color in the RGB input signal to determine the proportion of the additional saturated color signal to the sum of the converted RGB color signals such that the proportion of the additional saturated color signal is constant or decreases as the saturation of the additional color in the RGB input signal increases;
  decomposing the RGB input signal into a neutral component and a saturated color component;
  forming the neutral component as a combination of the RGB input signal and additional saturated color signals; and
  forming the saturated color component from the RGB input signal.

2. The method for converting an RGB input signal of claim 1, wherein the converted signal is determined as a function of the saturated color component and the neutral component.

3. The method for converting an RGB input signal of claim 1, wherein the method further comprising the steps of calculating an intermediate signal based upon a common signal and calculating the converted signal as a ratio of the initial RGB input signal and the intermediate signal.

4. The method for converting an RGB input signal of claim 3, wherein the step of calculation of the intermediate signal includes a transformation of the RGB input signal, calculating a minimum of the RGB input signal, or is a function of the minimum of a transformed RGB input signal and subtracting the minimum, or a function of the minimum, of the transformed RGB input signal from the RGB input signal.

5. The method for converting an RGB input signal according to claim 1, wherein the method limits the additional saturated color signal based upon an optical characteristic.

6. The method for converting an RGB input signal according to claim 5, wherein the optical characteristic is a change in chromaticity or luminance as a function of viewing angle.

7. The method for converting an RGB input signal according to claim 1, wherein the method limits the additional saturated color signal based upon the saturation of the input image signal.

8. The method of claim 1, wherein aim chromaticity coordinates for light-emitting elements driven by the converted signal are obtained and the aim chromaticity coordinates of the light-emitting element to be driven by the additional saturated color signal are formed from a combination of the chromaticity coordinates of two of the light-emitting elements driven by the converted RGB color signals, and wherein the converted RGB color signals for driving the two of the light-emitting elements is inversely related to the additional saturated color signal.

9. The method of claim 1, wherein the RGB input signal is mapped to a color gamut defined by chromaticity coordinates of light-emitting elements to be driven by the converted RGB color signals.

10. The method of claim 1, wherein the method further employs a correlate of the luminous efficiency of the light-emitting elements to be driven by the converted signal.

11. The method of claim 1, wherein the method further employs a correlate to the relative area of the light-emitting elements to be driven by the converted signal.

12. The method of claim 1, wherein the light-emitting element to be driven by the additional saturated color signal is yellow or cyan.

13. The method of claim 1, further including converting the RGB input signal to relative luminance intensity or converting the additional saturated color signal to gamma-corrected code values.

14. A method for converting a red, green, and blue (RGB) input signal to a converted signal having RGB color signals and an additional saturated color signal, comprising the steps of:
  calculating saturation of the additional saturated color in the RGB input signal to determine the proportion of the additional saturated color signal to the sum of the converted RGB color signals such that the proportion of the additional saturated color signal is constant or decreases as the saturation of the additional color in the RGB input signal increases;
  obtaining aim chromaticity coordinates for light-emitting elements to be driven by the converted signal, the aim chromaticity coordinates specifying a color space;
  partitioning the color space into three or more subgamut triangles;
  determining the subgamut triangles in which the color represented by the RGB input signal is located;
  determining the converted RGB and additional saturated color signals required to render the color represented by the RGB input signal for each subgamut triangle;
  determining the allowable proportion of the additional saturated color signal to the sum of the converted RGB color signals for producing the color represented by the RGB input signal; and
  forming the converted signal from a combination of the converted RGB and additional saturated color signals for each subgamut triangle subject to the allowable proportion.

15. A method for converting a red, green, and blue (RGB) input signal to a converted signal having RGB color signals and an additional saturated color signal, comprising the step of:
  calculating saturation of the additional saturated color in the RGB input signal to determine the proportion of the additional saturated color signal to the sum of the converted RGB color signals such that the proportion of the additional saturated color signal is constant or decreases as the saturation of the additional color in the RGB input signal increases,
  wherein the converted signal for an RGB input signal having equal RGB input signal values is formed primarily from the additional saturated color signal and one of the converted RGB color signals.

16. The method for converting an RGB input signal according to claim 15, wherein a maximum proportion of the additional saturated color signal to the sum of the converted RGB color signals is limited.

17. The method of claim 16, wherein the maximum proportion of the additional saturated color signal decreases as the additional saturated color signal increases.

18. The method of claim 17, wherein the maximum proportion of the additional saturated color signal to the sum of the converted RGB color signals is obtained comprising the steps of:
- obtaining a set of criteria for determining acceptable color rendering;
- obtaining the optical performance data for at least light-emitting elements to be driven by the additional saturated color signal for at least two viewing conditions;
- determining the maximum proportion of the additional saturated color signal to the sum of the converted RGB color signals that may be applied within the set of criteria for each of the two viewing conditions; and
- combining the maximum proportion of the additional saturated color signal to the sum of the converted RGB color signals for each of the two viewing conditions to obtain the maximum proportion of the additional saturated color signal to the sum of the converted RGB color signals that may be applied.

19. A digital controller for receiving a red, green, and blue (RGB) input signal, said digital controller converts the RGB input signal to a converted signal having RGB color signals and an additional saturated color signal, by calculating saturation of the additional saturated color in the RGB input signal to determine the proportion of the additional saturated color signal to the sum of the converted RGB color signals such that the proportion of the additional saturated color signal is constant or decreases as the saturation of the additional color in the RGB input signal increases; also said digital controller outputs the converted signal to drive an electronic display, by decomposing the RGB input signal into a neutral component and a saturated color component, by forming the neutral component as a combination of the RGB input signal and additional saturated color signals, and by forming the saturated color component from the RGB input signal.

* * * * *